US008380206B1

(12) United States Patent
Laitinen et al.

(10) Patent No.: US 8,380,206 B1
(45) Date of Patent: Feb. 19, 2013

(54) INDICATION OF USER EQUIPMENT MOBILITY STATE TO ENHANCE MOBILITY AND CALL PERFORMANCE

(75) Inventors: Pasi Petteri Laitinen, Oulunsalo (FI); Antti-Eemeli Suronen, Oulu (FI); Antti Olavi Kangas, Oulunsalo (FI)

(73) Assignee: Renesas Mobile Corporation, Tokyo (JP)

(*) Notice: Subject to any disclaimer, the term of this patent is extended or adjusted under 35 U.S.C. 154(b) by 20 days.

(21) Appl. No.: 13/222,074

(22) Filed: Aug. 31, 2011

Related U.S. Application Data

(60) Provisional application No. 61/525,371, filed on Aug. 19, 2011.

(51) Int. Cl.
*H04W 36/00* (2009.01)
*H04W 72/00* (2009.01)
(52) U.S. Cl. .................. 455/441; 455/436; 455/456.1
(58) Field of Classification Search .................. None
See application file for complete search history.

(56) References Cited

U.S. PATENT DOCUMENTS

| 2009/0143093 | A1 | 6/2009 | Somasundaram et al. | |
| 2009/0247161 | A1 | 10/2009 | Paui et al. | |
| 2010/0093350 | A1* | 4/2010 | Wang et al. | 455/436 |
| 2010/0120429 | A1* | 5/2010 | Kazmi et al. | 455/436 |
| 2011/0177806 | A1 | 7/2011 | Kazmi et al. | |
| 2011/0201279 | A1* | 8/2011 | Suzuki et al. | 455/67.11 |
| 2012/0088509 | A1* | 4/2012 | Yi | 455/437 |

FOREIGN PATENT DOCUMENTS

| WO | WO 2008/040962 A1 | 4/2008 |
| WO | WO 2011/101347 A1 | 8/2011 |

OTHER PUBLICATIONS

3GPP TS 36.331 V10.2.0 (Jun. 2011), Technical Specification, 3$^{rd}$ Generation Partnership Project; Technical Specification Group Radio Access Network; Evolved Universal Terrestrial Radio Access (E-UTRA); Radio Resource Control (RRC); Protocol Specification (Release 10), (294 pages).
3GPP TS 36.304 V10.2.0 (Jun. 2011), Technical Specification, 3$^{rd}$ Generation Partnership Project; Technical Specification Group Radio Access Network; Evolved Universal Terrestrial Radio Access (E-UTRA); User Equipment (UE) Procedures in Idle Mode (Release 10), (33 pages).
"3$^{rd}$ Generation Partnership Project; Technical Specification Group Radio Access Network; Evolved Universal Terrestrial Radio Access (E-UTRA); User Equipment (UE) procedures in idle mode (Release 10)", 3GPP TS 36.304 V10.1.0, Mar. 2011, 33 pgs.
"3$^{rd}$ Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.1.0, Mar. 2011, 290 pgs.

* cited by examiner

*Primary Examiner* — Philip Sobutka
(74) *Attorney, Agent, or Firm* — Lucas & Mercanti LLP; Robert P. Michal

(57) ABSTRACT

A user equipment UE reports its mobility state in signaling for establishing, re-establishing, or re-configuring a radio connection between the UE and a network access node. In one embodiment the reported mobility state is selected from among normal; medium and high. In another embodiment the reported mobility state informs of a number of cell changes the UE has performed within a predetermined evaluation period. The UE may also include an indication whether a hysteresis period for entering into a normal mobility state is running for the UE. The network configures the UE in dependence on the reported mobility state, such as setting a parameter for measuring or reporting neighbor cells (e.g., suspend a serving cell quality threshold as a condition for measuring/reporting; limit inter-frequency and/or inter-radio access technology reporting; set a shortest measurement reporting gap; disable an event trigger; and/or set layer 3 filtering of measurement results for faster reporting).

5 Claims, 4 Drawing Sheets

INDICATION OF USER EQUIPMENT MOBILITY STATE TO ENHANCE MOBILITY AND CALL PERFORMANCE

CROSS REFERENCE TO RELATED APPLICATION

This application claims priority to U.S. Provisional Patent Application Ser. No. 61/525,371 filed on Aug. 19, 2011, the contents of which is incorporated by reference in its entirety.

TECHNICAL FIELD

The exemplary and non-limiting embodiments of this invention relate generally to wireless communications systems, method, devices and computer programs and, more specifically, relate to signaling between a user equipment and a network access node for establishing a radio resource connection and similar connection mode transitions.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:

| | |
|---|---|
| AUC | authentication center |
| EUTRAN | evolved UTRAN |
| LTE | long term evolution |
| MCC | mobile country code |
| MNC | mobile network code |
| MME | mobility management entity |
| MNO | mobile network operator |
| RAT | radio access technology |
| RRC | radio resource connection // control |
| UE | user equipment |
| UTRAN | universal terrestrial radio access network |
| VLR | visitor location register |
| VOIP | voice over internet protocol |
| VoLTE | voice over LTE |

In a 3GPP system, for example an E-UTRAN system, a radio resource connection (RRC) layer may be used to broadcast system information related to an access layer and transport of messages in a non-access layer. In addition, an RRC layer can be used for operations such as user equipment (UE) measurements related to mobility, handover, quality of service (QOS), paging, and security key management.

There are two main modes of RRC, these modes being an RRC idle mode and an RRC connected mode. In either of these modes a UE may measure neighbor cells. An RRC connection with a network host must be established for a UE to transition from an RRC idle mode to an RRC connected mode. The UE will initiate such an RRC connection if the UE roams into a network, cell, or area of a new network host, such as a base station or an intermediary network node. In addition, an RRC connection establishment may be initiated by the UE if an application, such as an Internet Browser, is started at the UE. The UE is required to be in an RRC connected mode before the UE can perform signaling processes and/or transfer application data.

While in the RRC connected mode the network may change parameters which tell the UE specifics as to how and how often it is to measure and report on its neighbor cells. Some of those parameters may be set with reference to the mobility state of the UE. The UE can determine its mobility state by calculating how many cell reselections or handovers from one cell to another have taken place within a time period, as specified by network. These calculations effectively determine a speed at which the UE is operating. All else being equal, the network would prefer more frequent measurement reports from faster moving UEs.

But the network does not know the mobility state of a UE in the RRC idle mode. A problem arises where a fast moving UE in the idle mode transitions to the RRC connected mode in that it may not be giving to the network the optimum neighbor cell reports that would allow the network to properly manage the UE's handovers.

Embodiments of these teachings address this and other shortfalls within conventional wireless network practices.

SUMMARY

In an exemplary aspect of the invention, there is a method comprising determining a mobility state of a user equipment; and reporting the determined mobility state of the user equipment in signaling for establishing, re-establishing, or re-configuring a radio connection between the user equipment and a network access node.

In an exemplary aspect of the invention, there is a computer readable memory storing a computer program comprising: code for determining a mobility state of a user equipment; and code for reporting the determined mobility state of the user equipment in signaling for establishing, re-establishing, or re-configuring a radio connection between the user equipment and a network access node.

In an exemplary aspect of the invention, there is an apparatus comprising at least one processor and at least one memory including computer program code. In this aspect the memory and the computer program code are configured with the at least one processor to cause the apparatus to perform at least: determining a mobility state of a user equipment; and reporting the determined mobility state of the user equipment in signaling for establishing, re-establishing, or re-configuring a radio connection between the user equipment and a network access node.

In another exemplary aspect of the invention, there is a method comprising determining a mobility state of a user equipment from signaling, received from the user equipment, for establishing, re-establishing, or re-configuring a radio connection between the user equipment and a network access node; and configuring the user equipment in dependence on the determined mobility state.

In yet another exemplary aspect of the invention, there is an computer readable memory storing a computer program comprising: code for determining a mobility state of a user equipment from signaling received from the user equipment for establishing, re-establishing, or re-configuring a radio connection between the user equipment and a network access node; and code for configuring the user equipment in dependence on the determined mobility state.

In another exemplary aspect of the invention, there is an apparatus comprising: at least one processor and at least one memory. The at least one memory and the computer program code are configured with the at least one processor to cause the apparatus to perform at least: determining a mobility state of a user equipment from signaling, received from the user equipment, for establishing, re-establishing, or re-configuring a radio connection between the user equipment and a network access node; and configuring the user equipment in dependence on the determined mobility state.

These and other embodiments are detailed further below

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In order to optimize and/or prepare for UE mobility as quickly as possible, the exemplary embodiments provide techniques to report information comprising a mobility state of a UE to a network upon or during operations of an RRC connection setup. Such reported information will at least improve the efficiency of operations including the mobility of the UE for a handover to another cell, such as a handover to an inter-RAT cell, if one becomes necessary soon after the RRC connection is established with the EUTRAN cell.

The network being informed of the mobility speed of the UE, during or with the RRC connection establishment, can be most beneficial for use in establishing at least certain types of connections. For example, such knowledge by the network could benefit a call setup and a connection establishment for accessing an IP multi-media subsystem (IMS) or an IMS VoIP service or voice over LTE (VoLTE). This information would be particularly useful when the UE enters the RRC-CONNECTED state and begins to set up a call or access to a service.

One specification of interest is 3GPP TS 36.304, V10.1.0 (2011-03), 3rd Generation Partnership Project; Technical Specification Group Radio Access Network; Evolved Universal Terrestrial Radio Access (E-UTRA); User Equipment (UE) procedures in idle mode (Release 10), incorporated by reference herein in its entirety. Another specification of interest is 3GPP TS 36.331 V10.1.0 (2011-03) 3rd Generation Partnership Project; Technical Specification Group Radio Access Network; Evolved Universal Terrestrial Radio Access (E-UTRA); Radio Resource Control (RRC); Protocol specification (Release 10), also incorporated by reference herein in its entirety.

Figure 1A:
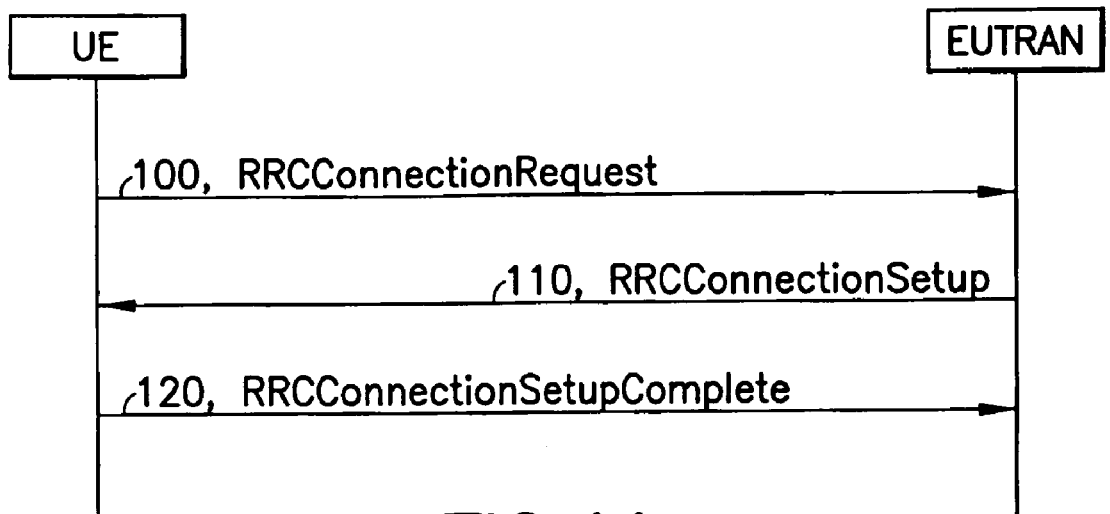
FIG. 1A is a conventional signaling diagram illustrating a successful RRC connection establishment.

FIG. 1A reproduces FIG. 5.3.3.1-1 of 3GPP TS 36.331, and shows the overall RRC connection establishment procedure. As illustrated in FIG. 1A, the UE starts the radio resource control (RRC) connection. The UE sends an RRCConnectionRequest message 100 requesting RRC connection setup to a base station such as of an evolved universal terrestrial radio access network (EUTRAN), hereafter referred to simply as EUTRAN. The EUTRAN sets up a radio link and sends the UE an RRCConnectionSetup message 110, the message comprising physical channel information. After the UE has synchronized itself with the EUTRAN, it transmits an acknowledgement RRCConnectionSetupComplete message 120. After the UE has set up the RRC connection, it may send higher-layer messages, such as a call setup message.

Figure 1B:
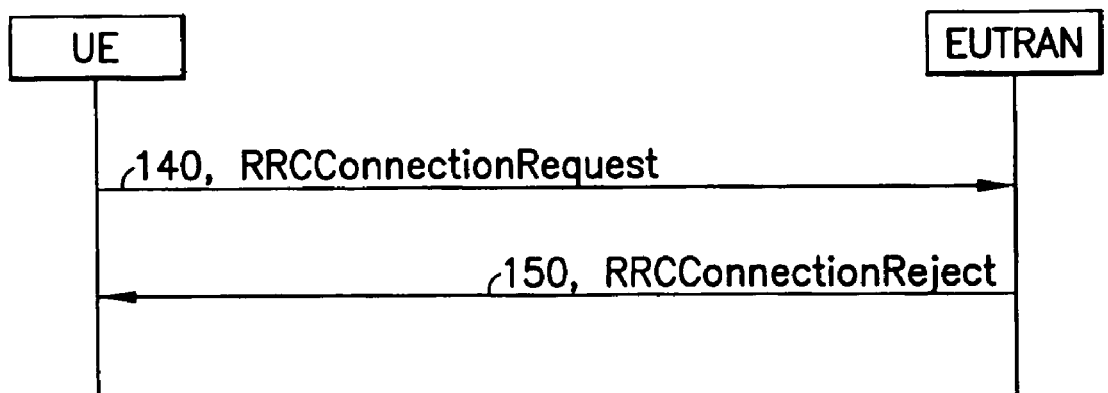
FIG. 1B is a conventional signaling diagram illustrating network reject of an RRC connection establishment procedure.

FIG. 1B reproduces FIG. 5.3.3.1-2 of 3GPP TS 36.331, and shows the overall RRC network reject procedure. FIG. 1B illustrates an example of an RRC connection failure. The EUTRAN can fail an attempt to set up a radio link. Such a failure can be due to hardware blocking, or an admission control can reject a setup attempt. In such a situation, in response to an RRCConnectionRequest message 140 the EUTRAN transmits an RRCConnectionReject message 150.

It is noted that, in accordance with the exemplary embodiments of the invention, the information comprising the mobility state of a UE can be provided to a network in any of the uplink messages 100, 120, 140 of FIGS. 1A and 1B.

According to 3GPP TS 36.304 section 5.2.4.3, a normal-mobility state, a high-mobility, and a medium-mobility state are applicable if the parameters ($T_{CRmax}$, $N_{C\_H}$, $N_{CR\_M}$ and $T_{CRmaxHyst}$) are sent in the system information broadcast of the serving cell. The mobility state of the UE is defined as follows:

Medium-Mobility State Criteria:
  If number of cell reselections during time period $T_{CRmax}$ exceeds $N_{CR\_M}$ and does not exceed $N_{CR\_H}$
High-Mobility State Criteria:
  If number of cell reselections during time period $T_{CRmax}$ exceeds $N_{CR\_H}$ In the above, $T_{CRmax}$ specifies the duration for evaluating allowed amount of cell reselection(s), $N_{CR\_M}$ specifies the maximum number of cell reselections to enter medium mobility state, $N_{CR\_H}$ specifies the maximum number of cell reselections to enter high mobility state, and $T_{CRmaxHyst}$ specifies the additional time period before the UE can enter normal-mobility.

Further according to 3GPP TS 36.304 section 5.2.4.3, The UE shall:
  if the criteria for High-mobility state is detected:
    enter High-mobility state.
  else if the criteria for Medium-mobility state is detected:
    enter Medium-mobility state.
  else if criteria for either Medium- or High-mobility state is not detected during time period $T_{CRmaxHyst}$:
    enter Normal-mobility state Based on whether the UE is on the move and the amount of cell reselections which occurred during a preceding time period, it may be warranted to change the mobility state of the UE, such as to a medium or high mobility state. In a medium or high mobility state it is more likely that the UE will need to be handed over to another cell (of the same or different RAT) soon after establishing its RRC connection. But the conventional RRC connection establishment process does not enable the new cell or network to know the mobility state of the UE. Knowledge by a network of a mobility state of the UE during RRC connection establishment can be beneficial to allow the network to set parameters for neighbor cell measurements which are optimized for UE speed.

In accordance with an exemplary embodiment of the invention, signaling including radio resource management connection messages from a user equipment (UE) are modified to include an extension comprising an indication of the UE mobility.

In accordance with the exemplary embodiments of the invention, a user equipment would report its mobility state and/or other information to a network upon, during, or upon a completion of an RRC connection establishment, re-establishment, and/or re-configuration with the network. This enables the network to optimize parameters that relate to UE speed.

Such optimization by the network would in various implementations result in one or more of the following:

immediately configure the UE to perform neighbor measurements and report the measurements and/or other information. Further, this could include enabling the network to configure the UE to perform inter-RAT reporting.

set measurement parameters on the UE such that neighbor measurements are performed faster and more efficiently by the UE. In addition, the network is able to configure the UE to enable certain types of measurements which would otherwise not be performed by the UE. For example the UE could be configured to disable s-Measure such that the measurements are performed even if the signal quality of the serving cell would at this point in time be good enough. The s-Measure is a threshold which, if used, indicates that the UE will measure inter-frequency and/or inter-RAT cells if the serving cell signal quality is above the s-Measure threshold. The network can configure the UE to perform operations regardless of other settings or thresholds of the UE (e.g. a good serving cell quality threshold). Further, in accordance with exemplary embodiments, the information provided to the network would enable operations at the network which would limit the amount of inter-frequency and inter-RAT frequencies and enable quicker reporting on cells. This is the case for at least the reason the network would already know the mobility states of the UEs and, based on the configured measurement reporting at the UEs, as described above, know which UEs have potentially the best coverage.

assign the UE the shortest measurement gap pattern periodicity (e.g., 40 ms rather than 80 ms) for inter-frequency/inter-RAT measurements. Also, periodic measurement reporting could be configured for the UE such that the UE will report on the neighboring cells without an event trigger or similar external prompting of such reporting. Also, the layer 3 filtering parameters could be set such that less filtering would be applied, thus resulting in faster results.

hand the UE over, such as based on access capacity, to a different coverage layer. For example, in this situation the UE may be handed over from a high frequency band and/or small cells to a low frequency band/larger cells. In accordance with the embodiments, a handover can be performed based on the knowledge of the network that the coverage layer coverage exists all over this capacity layer coverage. [for example, the UE is camping and established a connection with an LTE cell on a 2100 MHz frequency band (a capacity layer; smaller cells but high capacity due to fewer users per cell) and the network can hand the UE over to the coverage layer (a cell in the 800 MHz frequency band which is a larger cell but has lesser capacity due to a larger number of users per cell) even before the UE has made any measurements or reporting on the 800 MHz frequency band].

In accordance with the exemplary embodiments of the invention, if a UE is camping on (or idle) in a network cell, the network can hand over the UE and/or the UE can establish a connection with another cell in another frequency band, for example a LTE cell in a 2100 MHz frequency band. The LTE cell possibly being a smaller cell but having a high access capacity due to a small(er) amount of users. In addition, the network can hand the UE over to another larger coverage layer cell, for example a cell in an 800 MHz frequency band, even though larger cells may have a smaller capacity due to higher number of users in the cell. Furthermore, in accordance with the exemplary embodiments of the invention, the handover can be started and/or performed even before the UE has reported measurements of the 800 MHz frequency cell to the network.

Figure 2:
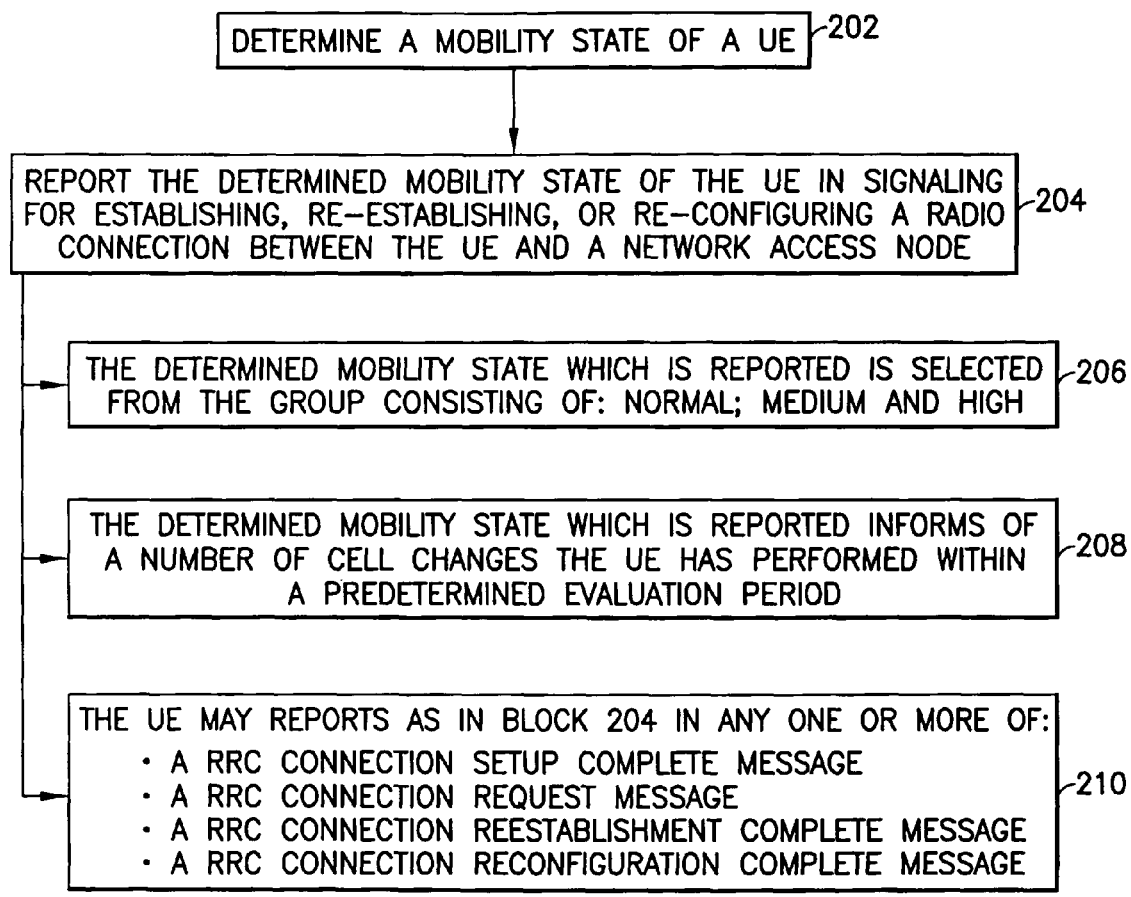
FIGS. 2 and 3 are logic flow diagrams each illustrating the operation of a method, and a result of execution of computer program instructions embodied on a computer readable memory, in accordance with the exemplary embodiments presented herein.

FIG. 2 is a logic flow diagram which describes the above exemplary embodiments of the invention from the perspective of the UE. FIG. 2 represents results from executing a computer program or an implementing algorithm stored in the local memory of the UE, as well as illustrating the operation of a method and a specific manner in which the processor and memory with computer program/algorithm are configured to cause that UE (or one or more components thereof) to operate.

Block 202 begins with the UE or components thereof determining a mobility state of a UE. By example the UE can track the number of cell changes it undergoes over a predetermined time period and either report that number or whether that number is within some pre-arranged range (normal, medium, high). Block 204 continues in that the UE reports the determined mobility state of the UE in signaling for establishing, re-establishing, or re-configuring a radio connection between the UE and a network access node.

The lower granularity reporting mentioned above is summarized at block 206: the determined mobility state which is reported is selected from the group consisting of: normal; medium and high. The higher granularity reporting mentioned above is summarized at block 208; the determined mobility state which is reported informs of a number of cell changes the UE has performed within a predetermined evaluation period. These differ in that reporting the mobility state as normal, medium or high merely informs the network of a possible range of cell changes the UE has undertaken per time period, wherein reporting so as to inform the network of the number of cell changes per time period is more precise in that it gives the actual number of cell changes rather than only a range. Either the above low or high granularity reporting may also have the UE include, in that same signaling of block 204, an indication whether a hysteresis period for entering into a normal mobility state is running for the user equipment.

Block 210 describes the specific messages from the above examples in which the UE may send this determined mobility state, any one or more of:

a radio resource control connection setup complete message;

a radio resource control connection request message;

a radio resource control connection reestablishment complete message; and a radio resource control connection reconfiguration complete message.

Figure 3:
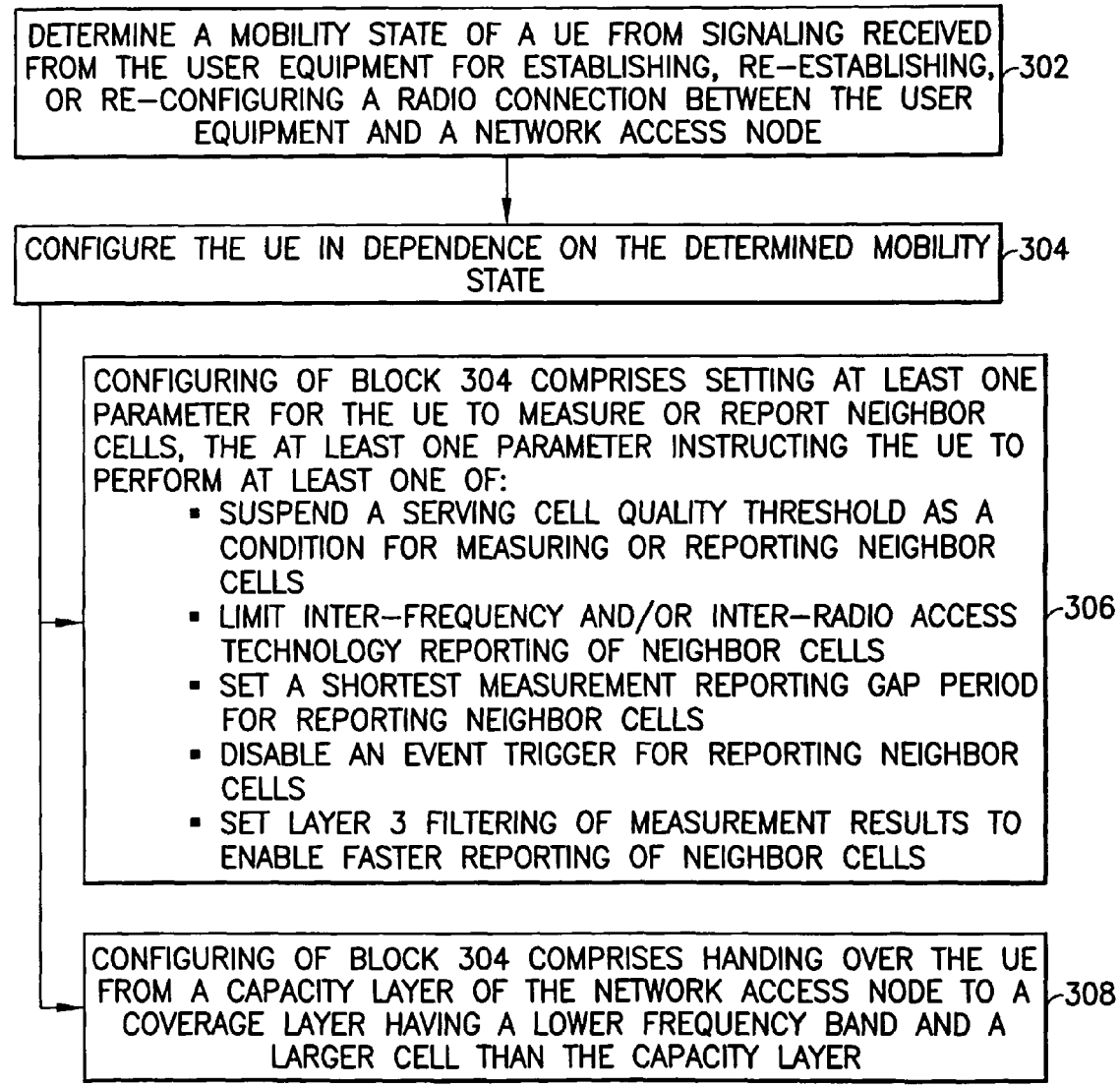

FIG. 3 is a logic flow diagram which describes the above exemplary embodiments of the invention from the perspective of the network, or more specifically the network access node with which the UE establishes, re-establishes and/or re-configures its RRC radio connection. FIG. 3 represents results from executing a computer program or an implementing algorithm stored in the local memory of the network access node, as well as illustrating the operation of a method and a specific manner in which the processor and memory with computer program/algorithm are configured to cause that UE (or one or more components thereof) to operate.

Block 302 begins with the network access node determining a mobility state of a UE from signaling, received from the user equipment, for establishing, re-establishing, or re-configuring a radio connection between the user equipment and a network access node. Then at block 304 the network access node configures the UE in dependence on the determined mobility state.

Various of the optional embodiments are summarized in the remainder of FIG. 3. At block 306 the configuring of block 304 is specified to mean setting at least one parameter for the user equipment to measure or report neighbor cells. By the above examples, the at least one parameter can instruct the UE to perform at least one of:
- suspend a serving cell quality threshold as a condition for measuring or reporting neighbor cells;
- limit inter-frequency and/or inter-radio access technology reporting of neighbor cells;
- set a shortest measurement reporting gap period for reporting neighbor cells;
- disable an event trigger for reporting neighbor cells; and
- set layer 3 filtering of measurement results to enable faster reporting of neighbor cells.

Or at block 308 the configuring of block 306 is handing over the UE from a capacity layer of the network access node to a coverage layer having a lower frequency band and a larger cell (larger geographic area) than the capacity layer.

Figure 4:
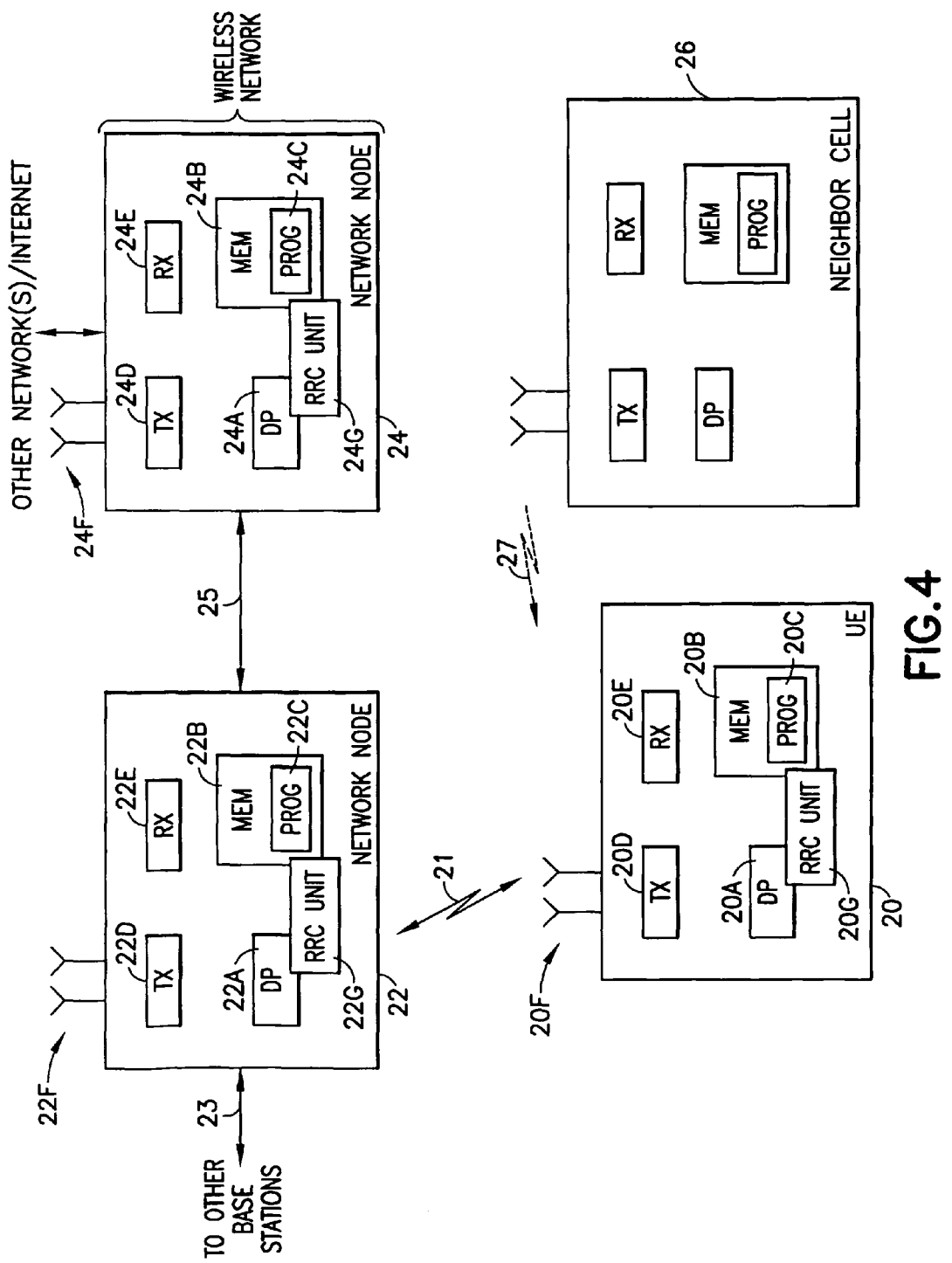
FIG. 4 illustrates a simplified block diagram of various electronic devices that are suitable for use in practicing the exemplary embodiments presented herein.

The various blocks shown in each of FIGS. 2 and 3 may also be considered as a plurality of coupled logic circuit elements constructed to carry out the associated function(s), or specific result or function of strings of computer program code stored in a computer readable memory. Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention FIG. 4 illustrates a simplified block diagram of various electronic devices and apparatus that are suitable for use in practicing the exemplary embodiments of this invention. In FIG. 4 a wireless network (network access node 22, neighbor cell 26, and higher network node 24) is adapted for communication over wireless link 21, and possibly link 23, with an apparatus, such as a mobile terminal or UE 20. The higher network node 24 may be implemented in the LTE system as a mobility management entity (MME) which provides connectivity with further networks (e.g., publicly switched telephone network (PSTN) and/or a data communications network/Internet).

The UE 20 includes processing means such as at least one data processor (DP) 20A, storing means such as at least one computer-readable memory (MEM) 20B storing at least one computer program (PROG) 20C or more generally computer program code, communicating means such as a transmitter TX 20D and a receiver RX 20E for bidirectional wireless communications with the node B 22 via one or more antennas 20F. Also the communications 27 between the UE 20 and the neighbor cell 26, such as measurements in accordance with the embodiments of the invention, can be performed via wireless link 27 and/or antennas 20F and 26F. Further, stored in the MEM 20B, for at least the RRC unit 20G, is at least the information related to exemplary embodiments of the invention including means for initiating an RRC establishment with a network node and providing information comprising a mobility state of the UE 20 to the network node, such as the network node 22, and means for receiving instructions, in accordance with the exemplary embodiments of the invention, from the network node.

The network access node 22 also includes processing means such as at least one data processor (DP) 22A, storing means such as at least one computer-readable memory (MEM) 22B storing at least one computer program (PROG) 22C or more generally computer program code, and communicating means such as a transmitter TX 22D and a receiver RX 22E for bidirectional wireless communications with at least the UE 20 via one or more antennas 22F. Further, also stored in the MEM 22B, for at least the RRC unit 22G, is the information related to the exemplary embodiments including receiving the information comprising the mobility state of the UE 20, as well as programming code executable to cause the network node 22 to use the information to optimize and prepare for the UE mobility, in accordance with the exemplary embodiments of the invention.

Similarly, the higher network node 24 includes processing means such as at least one data processor (DP) 24A, storing means such as at least one computer-readable memory (MEM) 24B storing at least one computer program (PROG) 24C or more generally computer program code, and communicating means such a modem 24D for bidirectional communications with at least the network access node 22 via the data/control path 25. Further, similar to the network access node 22, stored in the MEM 24B, for at least the RRC unit 24G, is the information related to the exemplary embodiments of the invention including receiving information comprising a mobility state of UE, should the need arise for the higher network node 24 to have this information, as well as computer program code configured to cause the higher network node 24 to use the information to optimize and prepare for the UE mobility, as in accordance with the exemplary embodiments of the invention. While not particularly illustrated for the UE 20 or network nodes 22, 26, each of those devices are also assumed to include as part of their wireless communicating means a modem which may be inbuilt on a radiofrequency RF front end chip within those devices 20, 22, 26 and which chip also carries the TX 20D/22D and the RX 20E/22E.

At least one of the PROGs 20C in the UE 20 is assumed to include program instructions that, when executed by the associated DP 20A, enable the device to operate in accordance with the exemplary embodiments of this invention, as detailed more fully above. In this regard the exemplary embodiments of this invention may be implemented at least in part by computer software stored on the MEM 20B which is executable by the DP 20A of the UE 20, or by hardware, or by a combination of tangibly stored software and hardware (and tangibly stored firmware). Electronic devices implementing these aspects of the invention need not be the entire UE 20, but exemplary embodiments may be implemented by one or more components of same such as the above described tangibly stored software, hardware, firmware and DP, or a system on a chip SOC or an application specific integrated circuit ASIC or a digital signal processor DSP or a modem or a subscriber identity module commonly referred to as a SIM card.

In general, the various embodiments of the UE 20 can include, but are not limited to: cellular telephones; data cards, USB dongles, personal portable digital devices having wireless communication capabilities including but not limited to laptop/palmtop/tablet computers, digital cameras and music devices, and Internet appliances.

Various embodiments of the devices in FIG. 4, such as the computer readable memories MEM 20B, MEM 22B, MEM 24B, and MEM 26B, include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 20A include but are not limited to general purpose computers, special purpose computers, microprocessors, digital signal processors (DSPs) and multi-core processors.

In addition, various modifications and adaptations to the foregoing exemplary embodiments of this invention may become apparent to those skilled in the relevant arts in view of the foregoing description. While the exemplary embodiments have been described above in the context of the EUTRAN system, it should be appreciated that the exemplary embodiments of this invention are not limited for use with only this one particular type of wireless communication system, and that they may be used to advantage in other wireless communication systems such as for example GERAN, UTRAN and others.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus for configuring user equipment comprising:
   at least one processor; and
   at least one computer readable memory including computer program code;
   the at least one memory and the computer program code configured with the at least one processor to cause the apparatus to perform:
   determining a mobility state of a user equipment from signaling received from the user equipment for establishing, re-establishing, or re-configuring a radio connection between the user equipment and a network access node;
   configuring the user equipment in dependence on the determined mobility state; and,
   wherein the user equipment performs at least one of:
   suspending a serving cell quality threshold as a condition for measuring or reporting neighbor cells;
   limiting inter-frequency and/or inter-radio access technology reporting of neighbor cells;
   setting a shortest measurement reporting gap period for reporting neighbor cells;
   disabling an event trigger for reporting neighbor cells; and
   setting layer 3 filtering of measurement results to enable faster reporting of neighbor cells.

2. The apparatus according to claim 1, wherein configuring the user equipment comprises setting at least one parameter for the user equipment to measure or report neighbor cells.

3. The apparatus according to claim 1, wherein configuring the user equipment comprises handing over the user equipment from a capacity layer of the network access node to a coverage layer having a lower frequency band and a larger cell than the capacity layer.

4. The apparatus according to claim 1, in which the apparatus comprises the network access node.

5. A non-transient computer readable memory storing a computer program executable by a processor which, when executed by the processor, causes the performance of operations comprising:
   determining a mobility state of a user equipment from signaling received from the user equipment for establishing, re-establishing, or re-configuring a radio connection between the user equipment and a network access node;
   configuring the user equipment in dependence on the determined mobility state; and
   wherein the configuring the user equipment comprises instructing the user equipment to perform at least one of:
   suspending a serving cell quality threshold as a condition for measuring or reporting neighbor cells;
   limiting at least one of inter-frequency and inter-radio access technology reporting of neighbor cells;
   setting a shortest measurement reporting gap period for reporting neighbor cells;
   disabling an event trigger for reporting neighbor cells; and
   setting layer 3 filtering of measurement results to enable faster reporting of neighbor cells.

* * * * *